United States Patent
Lam (10) Patent No.: US 8,650,628 B2
(45) Date of Patent: Feb. 11, 2014

(54) AUTOMATED USER AUTHENTICATION IDENTIFICATION FOR CUSTOMIZED CONVERGED SERVICES

(75) Inventor: Daniel D. Lam, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 376 days.

(21) Appl. No.: 12/768,272

(22) Filed: Apr. 27, 2010

(65) Prior Publication Data

US 2011/0265165 A1 Oct. 27, 2011

(51) Int. Cl.
*G06F 7/04* (2006.01)

(52) U.S. Cl.
USPC ............................................................. 726/8

(58) Field of Classification Search
USPC .................................. 726/4–8; 713/168, 182
See application file for complete search history.

(56) References Cited

U.S. PATENT DOCUMENTS

| | | | | |
|---|---|---|---|---|
| 6,616,035 B2* | 9/2003 | Ehrensvard et al. | ........... | 235/380 |
| 6,961,584 B2* | 11/2005 | Leedom, Jr. | ............... | 455/552.1 |
| 7,769,877 B2* | 8/2010 | McBride et al. | ............... | 709/230 |
| 8,099,503 B2* | 1/2012 | Yeates et al. | ................... | 709/227 |
| 8,131,317 B2* | 3/2012 | Lee | ............................... | 455/558 |
| 8,150,772 B2* | 4/2012 | Mardikar et al. | ............... | 705/64 |
| 2007/0101406 A1* | 5/2007 | Zavalkovsky et al. | ............ | 726/4 |

\* cited by examiner

*Primary Examiner* — Beemnet Dada
(74) *Attorney, Agent, or Firm* — Benjamin A. Balser; Balser & Grell IP Law (57) ABSTRACT

Systems and methods are disclosed for providing automated user authentication utilizing available authentication data associated with a computing device. By utilizing a mobile identification number verified during an authentication, authorization, and accounting (AAA) process performed when a mobile computing device is powered on, access to a privileged content or service may be granted, allowing a user to bypass manual entry of user authentication information (user ID and password). Utilizing a verified mobile identification number, service features and functionalities may be communicated between billing systems of a service provider, which may provide for further converged, customized services.

17 Claims, 5 Drawing Sheets

AUTOMATED USER AUTHENTICATION IDENTIFICATION FOR CUSTOMIZED CONVERGED SERVICES

BACKGROUND

Through interconnected distributed computing networks, a vast array of information resources and services may be provided through various network mediums and endpoint devices to a multitude of users. Distributed computing networks, such as the Internet, may be accessed almost anywhere by numerous means, such as through mobile computing devices. Mobile computing devices (e.g., mobile phones, PDAs, smartphones, etc.) may allow a user to connect to the Internet from anywhere there is a wireless network that supports the device's technology.

In today's electronic and mobile environment, it is common for a user to utilize a mobile computing device to access remote services and information resources connected to a distributed computing network. Oftentimes, user authentication may be required prior to granting access to a privileged content or service. Authentication typically entails entering a user identification (user ID) and password in an effort to verify a user's identity. As can be appreciated, user authentication via a mobile computing device can be cumbersome due to a variety of factors. It is not uncommon for a user to access various Web-based accounts, and thus have multiple user IDs and passwords. This can be difficult for a user to keep track of. In addition, typically, each time a user wants to access a privileged content or service, he/she may be required to enter his/her user ID and password. Due to such factors as small buttons, touch screen interfaces, key configurations, etc., data entry on a mobile computing device can be both inaccurate and inefficient.

It is with respect to these and other considerations that the present invention has been made.

SUMMARY

Consistent with embodiments of the present invention, systems and methods are disclosed for providing automated user authentication utilizing available authentication data associated with a computing device. By utilizing a mobile identification number verified during an authentication, authorization, and accounting (AAA) process performed when a mobile computing device is powered on, access to a privileged content or service may be granted, allowing a user to bypass manual entry of user authentication information (user ID and password). Utilizing a verified mobile identification number, service features and functionalities may be communicated between billing systems of a service provider, which may provide for further converged, customized services.

With changing consumer lifestyles and technology convergence, some service providers are providing converged services. For example, a service provider may offer customers one or more services such as fixed voice, broadband, cable (CATV), satellite, and/or mobile telephone services. Converged wireless applications may be provided by a service provider to access an associated account from a mobile computing device. For example, if a user subscribes to cable television service, the user may utilize his/her mobile phone to access his/her account and browse television (TV) listings associated with his/her account.

As mentioned previously, a user may have multiple services provided by a service provider. According to embodiments, in cases where a subscriber has a mobile telephone service associated with his/her account, authentication information associated with a mobile computing device number may be utilized as a user identity for an application instead of a user ID and password. When a user turns on a mobile computing device, an authentication process with a wireless network is performed. During an authentication process, a mobile identification number associated with the mobile computing device may be verified with a service provider database to ensure such information as whether the phone number is a legitimate telephone number that belongs to the specified service provider network, services which may be subscribed to (e.g., SMS, web browsing, etc.), restrictions which may be placed on the device (e.g., parental controls), etc. Embodiments of the present invention allow for a mobile identification number verified during an authentication process to be utilized by an application as user authentication identification information.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

As briefly described above, embodiments of the present invention are directed to providing automated user authentication identification. By utilizing already validated authentication data, an application may be accessed without further manual data entry of authentication information by a user. When a user powers up a mobile computing device, such as a mobile phone, the device may perform an authentication with an associated wireless network. During the authentication process, a mobile identification number may be verified against a service provider's database. Subsequently, when a functionality is selected by a user (e.g., opening an application) which may require user identification authentication, authentication data already validated during the authentication process may be utilized as a user identity. By taking advantage of already validated authentication data, data entry by a user, which can be a very cumbersome process on a mobile device, may be minimized.

According to embodiments, validated authentication data (e.g., a mobile identification number) may be utilized to look up features and functionalities associated with other services offered by a service provider. The search for other service features and functionalities may involve separate billing systems and may require a communication between the separate billing systems. By allowing communication between and an integration of billing systems, a user identity may be utilized to provide further converged, customized services to a user.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Figure 1:
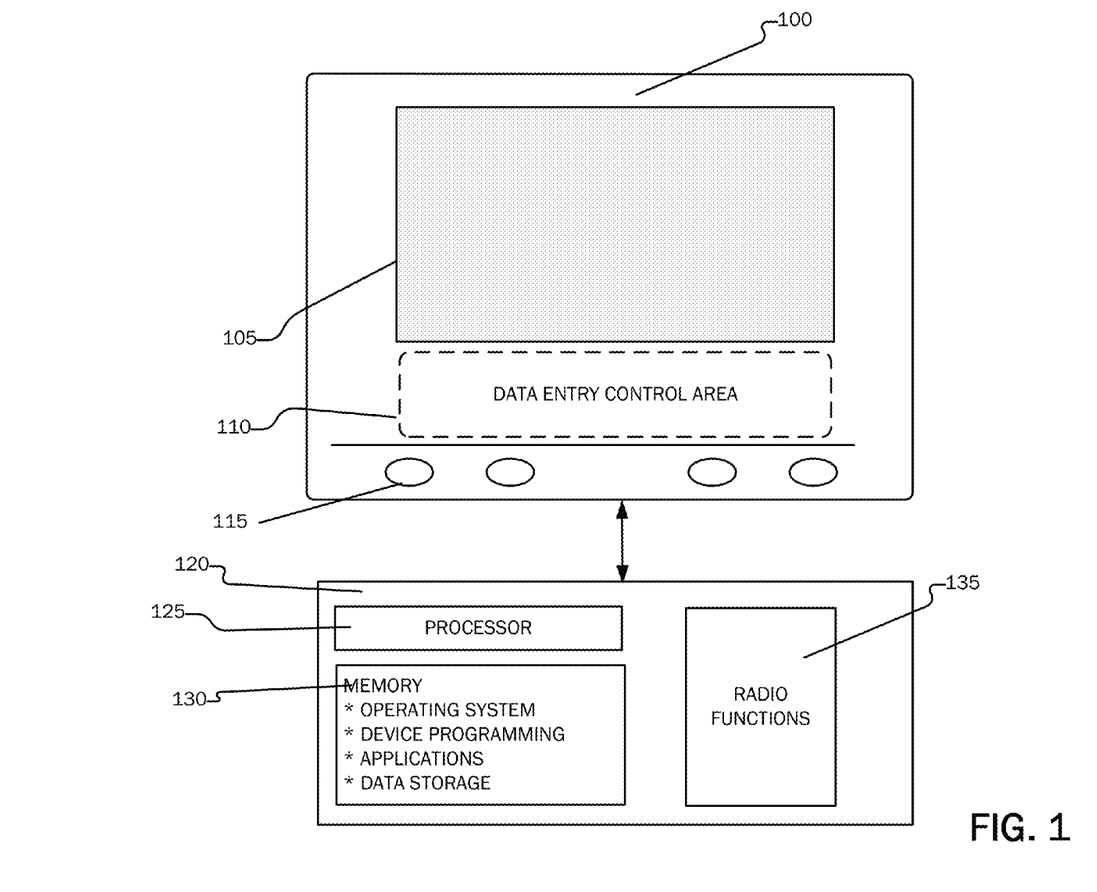
FIG. 1 is a block diagram of a mobile computing device with which embodiments of the present invention may be practiced.

FIG. 1 is a block diagram of a mobile computing device with which embodiments of the present invention may be practiced. The mobile computing device 100 is illustrative of any suitable device, such as a mobile telephone, personal digital assistant (PDA), or handheld computer, operative to send, receive and process wireless communications according to embodiments of the present invention. A display screen 105 is operative for displaying a variety of information such as information about incoming and outgoing communications, as well as, a variety of data and displayable objects, for example, text, alphanumeric data, photographs, and the like.

Data input to the device 100 may be performed via a variety of suitable means, such as, touch screen input via the display screen 105, keyboard or keypad input via a data entry area 110, key input via one or more selectable buttons or controls 115, voice input via a microphone disposed on the device 100, photographic input via a camera functionality associated with the mobile computing device, or any other suitable input means. Data may be output via the device 100 via any suitable output means, including but not limited to, display on the display screen 105, audible output via an associated speaker or connected earphone system, vibration module for providing tactile output, and the like.

Operational unit 120 is illustrative of internal operating functionality of the mobile computing device 100. A processor 125 is illustrative of a general purpose computer processor for processing incoming and outgoing data and communications and controlling operation of the device and associated software applications via a mobile computing device operating system. Memory 130 may be utilized for storing a device operating system, device programming, one or more stored applications, for example, mobile telephone applications, data processing applications, calculators, games, Internet browsing applications, navigation applications, etc. Radio functions 135 include all required functionality, including onboard antennae, for allowing the device 100 to communicate with other communication devices and systems, as is further described below with respect to FIG. 5.

Although described herein in combination with mobile computing device 100, in alternative embodiments the invention may be used in combination with any number of computer systems, such as in desktop environments, laptop or notebook computer systems, multiprocessor systems, microprocessor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Figure 2:
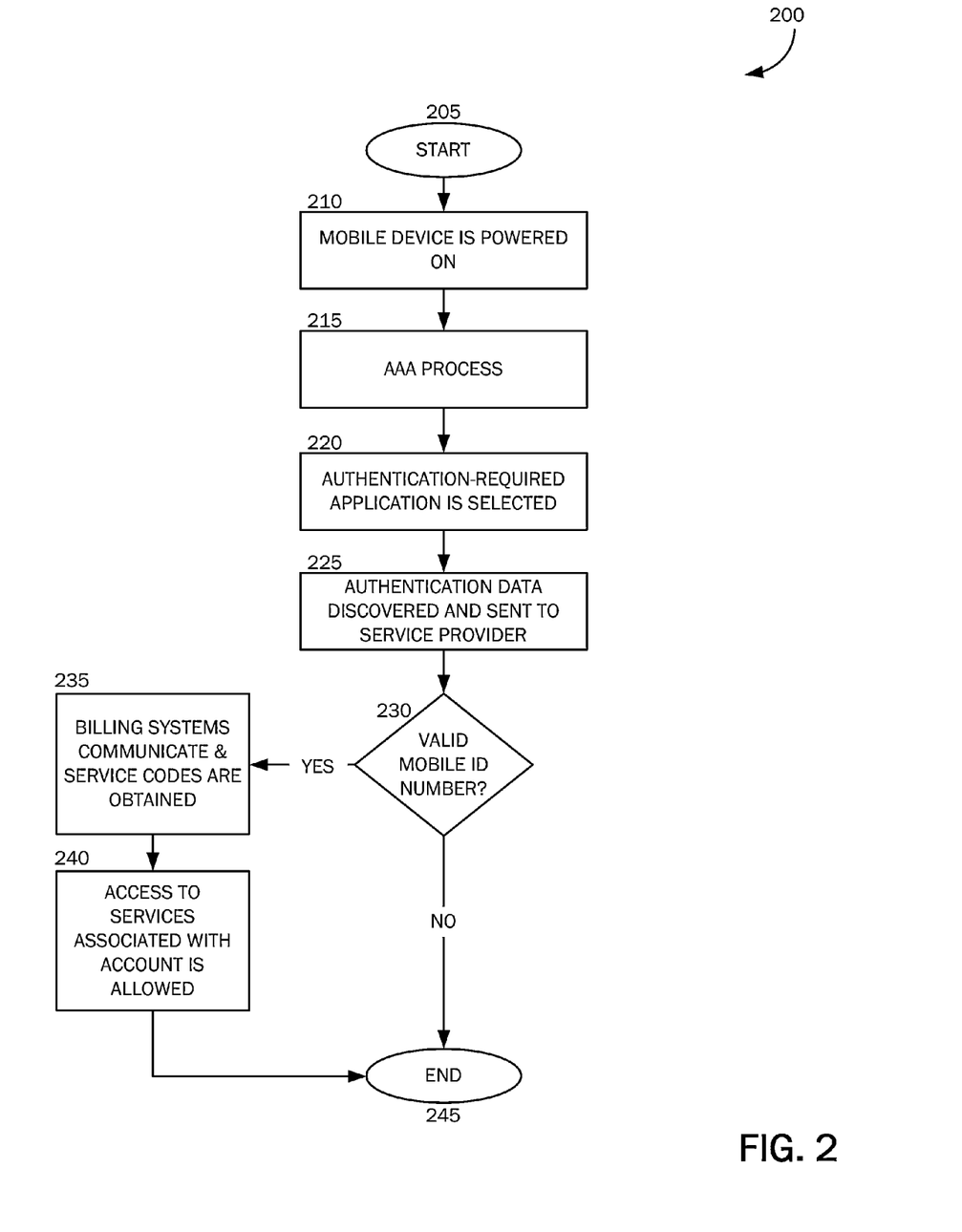
FIG. 2 is a flow diagram of a method 200 for providing automated user authentication identification.

Having described elements of a mobile computing architecture 100 that may serve as an exemplary operating environment for embodiments of the present invention, FIG. 2 is a flow diagram of a method 200 for providing automated user authentication identification. The method 200 starts at OPERATION 205 and proceeds to OPERATION 210 where a mobile computing device is powered on. As should be appreciated, there are numerous makes and models of mobile computing devices, and each may have a unique way in which it may be powered on. According to embodiments, powering on a mobile computing device may include powering on the device from a powered-off status or restarting the device. When a mobile computing device is powered on, it may be connected with a wireless provider through transmission of signals through an antenna.

The method proceeds to OPERATION 215 where the powered-on mobile computing device may be authenticated with a wireless network. According to embodiments, when a mobile computing device is authenticated, an AAA protocol may be performed. AM commonly stands for "authentication, authorization, and accounting." Authentication may refer to a process where a confirmation is made that a user is valid via a presentation of appropriate credentials (e.g., mobile identification number). That is, when a mobile computing device is powered on, authentication data associated with the mobile computing device may be compared with user-associated data stored in a service provider's database. A mobile identification number (i.e., phone number) of a mobile computing device may be verified with a service provider's database to make sure that the number is a legitimate phone number and belongs within the specified service provider's network. According to embodiments, if a phone number is verified as legitimate, access to a service provider's network may be granted. Alternatively, if an authentication fails to verify, access to a service provider's network may be denied.

Authorization may refer to a process where based on a user's authentication and a current system state, specific types of services may be granted or rejected. That is, rights and services for which a user may be allowed to utilize or access may be defined. For example, if a user subscribes to services such as SMS text messaging and parental controls, access privileges to those services may be enabled.

Accounting may refer to a process where a consumption of network resources by a user may be tracked. Accounting information may be processed in real-time or saved and delivered at a later time. When a user utilizes a service, information gathered during the accounting process may include, but is not limited to, an identity of the user, a nature of the service delivered, when the service began, when the service ended, an amount of data usage, resource consumption, etc.

The method 200 proceeds to OPERATION 220, where an application requiring user-authentication is selected. As mentioned above, in a converged services environment, a user of the mobile computing device 100 may use the mobile computing device 100 to access one or more software applications, features, functionalities or services from one or more disparate service systems via a wireless network to the one or more disparate service systems. For example, the user may have subscribed to a feature with his/her cable television services system (CATV) provider to allow the user to access CATV services via a mobile computing device 100. Components and features of a CATV are described below with respect to FIG. 5. For example, consider that a user may wish to access a web service resource of his/her CATV provider, such as a Remote Digital Video Recorder (DVR) Scheduler Application with which the user may remotely schedule the recording of one or more television programs available through his/her CATV provider. A Remote DVR Scheduler Application may be linked to or programmed in a user's CATV set-top box (see FIG. 5) for allowing the user to remotely view TV listings associated with his/her STB, and for allowing the user to subsequently schedule a recording of programming if desired. As should be appreciated, each individual user may view different TV listings when utilizing a Remote DVR Scheduler Application since it is associated with an individual's STB/CATV account. When an application, such as a Remote DVR Scheduler Application, is associated with privileged data, such as a service resource account, user authentication may be required. As should be appreciated, access of a Remote DVR Scheduler Application via the automated authentication methods and systems described herein is for purposes of example only and is not limiting of the vast numbers and types of applications and services that a user may access via the mobile computing device 100 as described herein.

Through utilization of embodiments of the present invention, manual entry of authentication information may be bypassed. At OPERATION 225, authentication data associated with the mobile computing device 100 may be discovered and sent to a service provider server for comparison with user-associated data stored in a service provider's database. A mobile identification number may reside in and be requested from the operating system of the mobile computing device. A mobile identification number (e.g., phone number) of a mobile computing device may be verified with a service provider's database to make sure that the number is a legitimate phone number and belongs within the specified service provider's network. According to embodiments, a validated mobile identification number may be utilized as a user identity instead of a user ID and password.

The method 200 proceeds to DECISION OPERATION 230, where a determination is made as to whether the discovered and sent mobile identification number is a valid number. That is, the sent mobile identification number may be compared with user-associated data stored in a service provider's database. Subsequently, a determination may be made as to whether the mobile identification number belongs to the service provider and is associated with existing account.

If it is determined that the mobile identification number is valid and belongs to the service provider, the method 200 proceeds to OPERATION 235, where a communication between billing systems may occur, and wherein service codes may be obtained. Service codes may reveal such information as an account number associated with the mobile identification number, and to what services a user associated with the account may subscribe. For example, a service code may reveal that a user subscribes to DVR service. According to embodiments, service codes may be utilized to allow a user to remotely access those services to which he/she subscribes.

According to embodiments, a service provider may have separate billing systems for various offered services. For example, a service provider may provide CATV services, broadband, mobile telephone services, and/or fixed-line telephone services. Each service may have its own separate billing system, or different combinations of services may utilize common billing systems. Embodiments of the present invention allow for separate billing systems to integrate, so that using only a mobile identification number, an application may look up other non-wireless service features and functionalities. By communicating service features and functionalities across separate systems, a user may be provided with further converged, customized services.

The method 200 proceeds to OPERATION 240, where depending on the service codes obtained from the service provider database, services may be provided to the user. For example, if a service code reveals that a user subscribes to DVR service, the application may allow for the user to remotely access features associated with his/her DVR service. After OPERATION 240, or if a determination is made at DECISION OPERATION 230 that the mobile identification number is not valid, the method 200 ends at OPERATION 245.

Figure 3A:
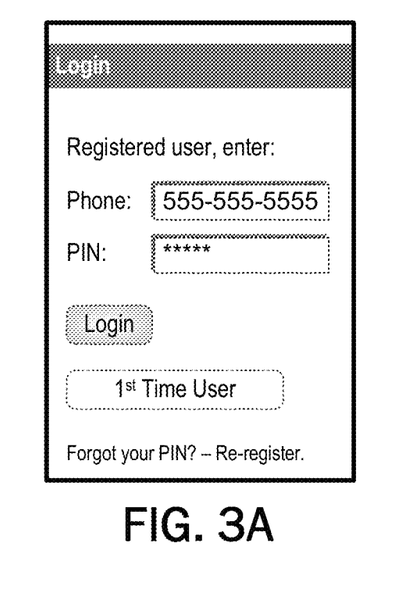
FIGS. 3A, 3B, and 3C are illustrations of example screenshots of an example application accessed on a mobile computing device without applying embodiments of the present invention.
Figure 3B:
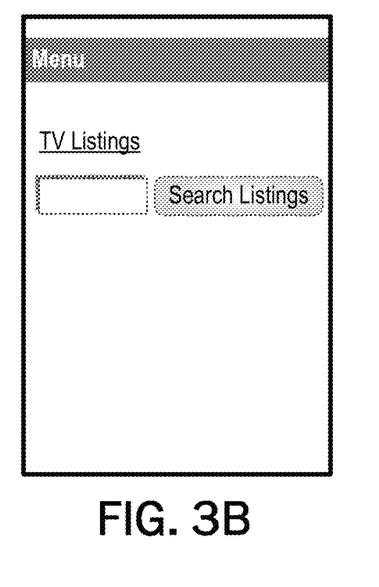
Figure 3C:
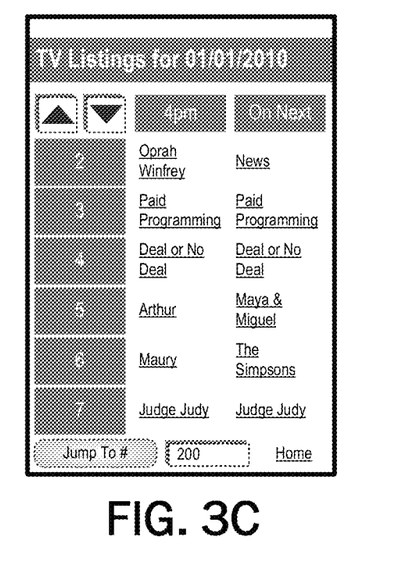

Having described a method 200 for providing automated user authentication identification according to embodiments of the present invention, FIGS. 3A, 3B, and 3C are illustrations of example screenshots of an example application accessed on a mobile computing device without applying embodiments of the present invention. The content illustrated in FIGS. 3A, 3B and 3C follow from the example Remote DVR Scheduler Application described above, but as should be appreciated, the content illustrated in FIGS. 3A, 3B and 3C, is for purposes of example only and is not limiting of other types of services, features or content that may be accessed via the mobile computing device 100. Referring now to FIG. 3A, a user may open an application requiring user authentication identification data. In this example, a user may be requested to enter a phone number and PIN in order to log into the example remote application. Manual entry of user authentication information via a user interface such as the example interface shown in FIG. 3A may be cumbersome due to a variety of factors such as small button sizes, touch screen interfaces, key configurations, etc. Once a user manually enters his/her authentication information, FIGS. 3B and 3C are illustrations of example user interfaces associated with an example accessed remote application.

Figure 4A:
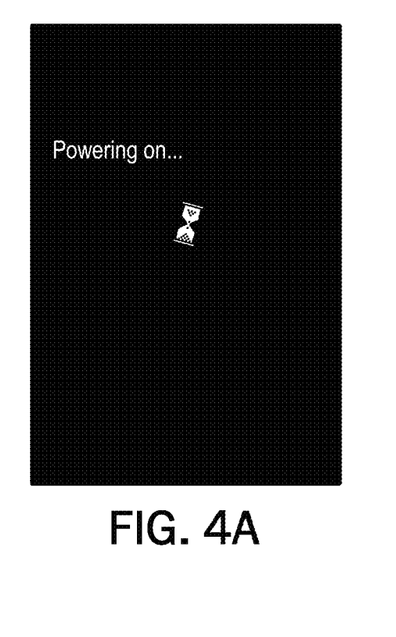
FIGS. 4A, 4B, and 4C are illustrations of example screenshots of an example application accessed on a mobile computing device utilizing embodiments of the present invention.
Figure 4B:
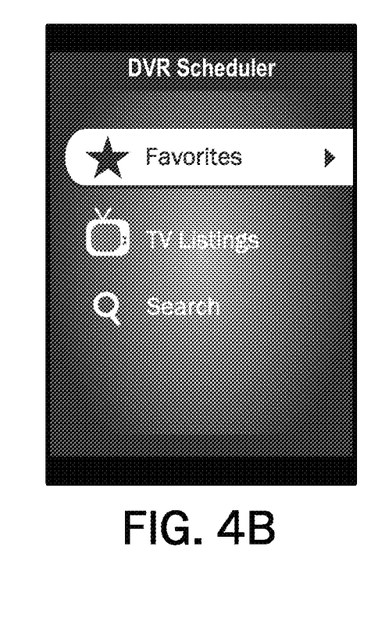
Figure 4C:
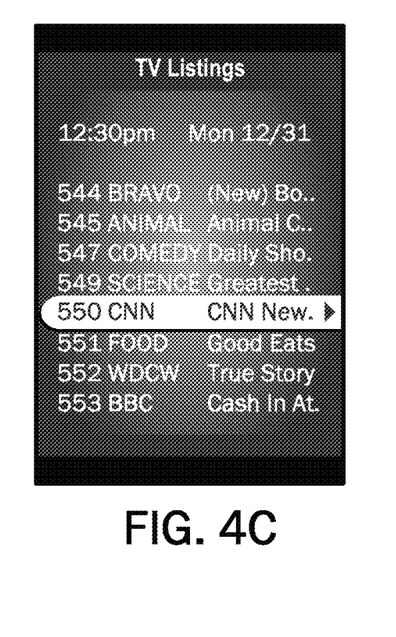

FIGS. 4A, 4B, and 4C are illustrations of example screenshots of an example application accessed on a mobile computing device utilizing embodiments of the present invention. The content illustrated in FIGS. 4A, 4B and 4C follow from the same Remote DVR Scheduler Application example described above. Referring now to FIG. 4A, when a user powers on a mobile computing device, an authentication process is performed wherein a mobile computing device's identification is verified with information stored in a service provider database. According to embodiments, when a user launches an application requiring user authentication information, the mobile identification number may be captured and passed to the service provider for verification. That is, a mobile application may use a mobile identification number as a user identity instead of a user ID and password. According to embodiments, a process of typing personal credentials to gain access to an application may be bypassed by allowing an application to utilize a mobile identification number as a user's identity. Subsequently, a communication with a database containing service codes may be performed, wherein account information associated with the verified mobile computing device may be obtained. According to embodiments, in a backend of a service system, other non-wireless service features and functionalities may be accessed by an application to provide further converged, customized services.

Once account information is obtained, a user may gain access to services associated with an application requiring user authentication information. FIGS. 4B and 4C are illustrations of example user interfaces of an accessed application. An accessed application may present a user with a customized service, such as customized TV Listings as shown in FIG. 4C. Customized TV Listings may be based on a channel lineup for a household to which the mobile identification number belongs. According to embodiments, features and functionalities of a service may be obtained using a user identity associated with a separate service provided by the same service provider.

Figure 5:
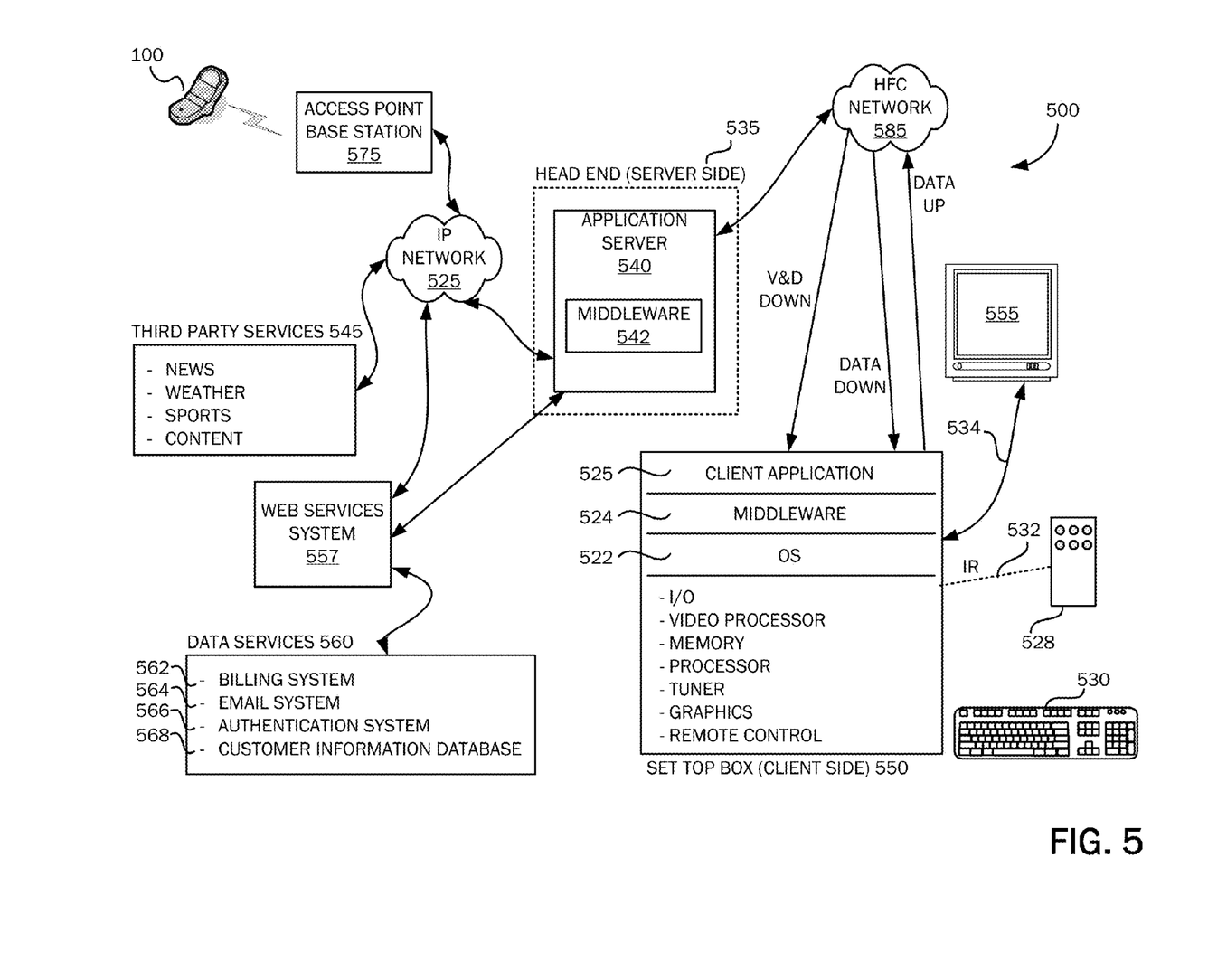
FIG. 5 is a block diagram of a cable television/services (CATV) system 500 with which embodiments of the present invention may be practiced.

As described above, a user of the mobile computing device 100 operating in a converged services environment may utilize the mobile computing device 100 to access one or more applications, features or services via one or more disparate and/or remote systems via a wireless network through with the device 100 operates. When the user attempts access to such systems, authentication may be required to ensure the user is authorized to access the desired systems. As mentioned above, by way of example, the mobile computing device 100 may allow the user to access service offerings available via his/her cable television services system, for example, a Remote DVR Scheduler Application. With reference to FIG. 5, a cable television/services system (hereafter referred to as "CATV") architecture 500 that may serve as an exemplary operating environment for embodiments of the invention is described.

Referring now to FIG. 5, digital and analog video programming, information content and interactive television services are provided via a hybrid fiber coax (HFC) network 585 to a television set 555 for consumption by a cable television/services system customer. As is known to those skilled in the art, HFC networks 585 combine both optical fiber and coaxial cable lines. Typically, optical fiber runs from the cable head end 535 to neighborhoods of 500 to 2,000 customers. Coaxial cable runs from the optical fiber feeders to each customer. According to embodiments of the present invention, the functionality of the HFC network 585 allows for efficient bidirectional data flow between the client-side set-top box 550 and the server-side application server 540 of the present invention.

According to embodiments of the present invention, the CATV system 500 is in the form of a distributed client-server computing system for providing video and data flow across the HFC network 585 between server-side services providers (e.g., cable television/services providers) via a server-side (backend) head end 535 and a client-side customer via a client-side set-top box (STB) functionally connected to a customer receiving device, such as the television set 555. As is understood by those skilled in the art, modern CATV systems 500 may provide a variety of services across the HFC network 585 including traditional digital and analog video programming, telephone services, high speed Internet access, video-on-demand, and information services.

On the client side of the CATV system 500, digital and analog video programming and digital and analog data are provided to the customer television set 555 via the set-top box (STB) 550. Interactive television services that allow a customer to input data to the CATV system 500 likewise are provided by the STB 550. As illustrated in FIG. 5, the STB 550 is a multipurpose computing device having a computer processor, memory and an input/output mechanism. The input/output mechanism of a STB 550 receives input from server-side processes via the HFC network 585 and from customers via input devices such as the remote control device 528 and the keyboard 530. The remote control device 528 and the keyboard 530 may communicate with the STB 550 via a suitable communication transport such as the infrared connection 532. The STB 550 also includes a video processor for processing and providing digital and analog video signaling to the television set 555 via a cable communication transport 534. A multi-channel tuner is provided for processing video and data to and from the STB 550 and the server-side head end system 535, described below.

The STB 550 also includes an operating system 522 for directing the functions of the STB 550 in conjunction with a variety of client applications 525. For example, if a client application 525 requires a news flash from a third-party news source to be displayed on the television 555, the operating system 522 may cause the graphics functionality and video processor of the STB 550, for example, to output the news flash to the television 555 at the direction of the client application 525 responsible for displaying news items.

Because a variety of different operating systems 522 may be utilized by a variety of different brands and types of set-top boxes, a middleware layer 524 is provided to allow a given software application to be executed by a variety of different operating systems. According to an embodiment of the present invention, the middleware layer 524 may include a set of application programming interfaces (API) that are exposed to client applications 525 and operating systems 522 that allow the client applications to communicate with the operating systems through common data calls understood via the API set. As described below, a corresponding middleware layer is included on the server side of the CATV system 500 for facilitating communication between the server-side application server and the client-side STB 550. According to one embodiment of the present invention, the middleware layer 542 of the server-side application server and the middleware layer 524 of the client-side STB 550 format data passed between the client side and server side according to the Extensible Markup Language (XML). As should be appreciated XML is only one example formatting type and other suitable formatting languages or types may be utilized. As also should be appreciated by those skilled in the art, although some embodiments described in this specification are oriented to middleware installed and executed on a STB 550, alternative embodiments implemented as firmware or as hardware are well within the scope of the present invention.

According to one embodiment, the set-top box 550 passes digital and analog video and data signaling to the television 555 via a one-way communication transport 534. According to other embodiments, two-way communication transports may be utilized, for example, via high definition multimedia (HDMI) ports. The STB 550 may receive video and data from the server side of the CATV system 500 via the HFC network 585 through a video/data downlink and data via a data downlink. The STB 550 may transmit data from the client side of the CATV system 500 to the server side of the CATV system 500 via the HFC network 585 via one data uplink. The video/data downlink is an "in band" downlink that allows for digital and analog video and data signaling from the server side of the CATV system 500 through the HFC network 585 to the set-top box 550 for use by the STB 550 and for distribution to the television set 555. As is understood by those skilled in the art, the "in band" signaling space may operate across a variety of frequency ranges, for example, at a frequency between 54 and 1000 megahertz. The signaling space is generally divided into 6 megahertz channels in which may be transmitted a single analog signal or a greater number (e.g., up to ten) digital signals.

The data downlink and the data uplink, illustrated in FIG. 5, between the HFC network 585 and the set-top box 550 comprise "out of band" data links. As is understand by those skilled in the art, the "out of band" frequency range generally lies between zero and 54 megahertz. According to embodiments of the present invention, data flow between the client-side set-top box 550 and the server-side application server 540 is typically passed through the "out of band" data links. Alternatively, an "in band" data carousel may be positioned in an "in band" channel into which a data feed may be processed from the server-side application server 540 through the HFC network 585 to the client-side STB 550. Operation of data transport between components of the CATV system 500, described with reference to FIG. 5, is well known to those skilled in the art.

Referring still to FIG. 5, the head end 535 of the CATV system 500 is positioned on the server side of the CATV system and includes hardware and software systems responsible for originating and managing content for distributing through the HFC network 585 to client-side STBs 550 for presentation to customers via televisions 555. As described above, a number of services may be provided by the CATV system 500, including digital and analog video programming, interactive television services, telephone services, video-on-demand services, targeted advertising, and provision of information content.

The application server 540 is a general-purpose computing system operative to assemble and manage data sent to and received from the client-side set-top box 550 via the HFC network 585. As described above with reference to the set-top box 550, the application server 540 includes a middleware layer 542 for processing and preparing data from the head end of the CATV system 500 for receipt and use by the client-side set-top box 550. For example, the application server 540 via the middleware layer 542 may obtain data from third-party services 545 via the Internet 525 for transmitting to a customer through the HFC network 585 and the set-top box 550. For example, a weather report from a third-party weather service may be downloaded by the application server via the Internet 525. When the application server 540 receives the downloaded weather report, the middleware layer 542 may be utilized to format the weather report for receipt and use by the set-top box 550. According to one embodiment of the present invention, data obtained and managed by the middleware layer 542 of the application server 540 is formatted according to the Extensible Markup Language and is passed to the set-top box 550 through the HFC network 585 where the XML-formatted data may be utilized by a client application 525 in concert with the middleware layer 524, as described above. As should be appreciated by those skilled in the art, a variety of third-party services data, including news data, weather data, sports data and other information content, may be obtained by the application server 540 via distributed computing environments such as the Internet 525 for provision to customers via the HFC network 585 and the set-top box 550. According to an embodiment of the present invention, digital video recording functionality may be located remotely on the head end (server side) 535 and called upon by a client set-top box 550.

As illustrated in FIG. 5, the services provider data services 560 include a number of services operated by the services provider of the CATV system 500 which may include data on a given customer. For example, a billing system 562 may include information such as a customer's name, street address, business identification number, Social Security number, credit history, and information regarding services and products subscribed to by the customer. An electronic mail system 564 may contain information such as electronic mail addresses, high-speed Internet access subscription information and electronic mail usage data. An authentication system 566 may include information such as secure user names and passwords utilized by customers for access to network services.

The customer information database 568 may include general information about customers such as place of employment, business address, business telephone number and demographic information such as age, gender, educational level, and the like. The customer information database may also include information on products and services subscribed to by a customer from her cable services provider. For example, in accordance with embodiments of the present invention, the customer information database may contain data to allow a determination as to whether a particular product or service is already provisioned at a customer service address or whether a work order is pending for a particular product or service provisioning at the customer service address. The customer information database may also include information that allows for a determination as to whether prerequisites for provisioning a requested product of service are met by a requesting customer. For example, if a customer requests electronic mail services and high speed Internet access is a prerequisite for electronic mail services, the customer information database may be queried to determine whether the required Internet access is provisioned at the requesting customer location or address.

As should be understood by those skilled in the art, the disparate data services systems 562, 564, 566, 568 are illustrated as a collection of data services for purposes of example only. The example data services systems comprising the data services 560 may operate as separate data services systems, which communicate with a web services system (described below) along a number of different communication paths and according to a number of different communication protocols Referring still to FIG. 5, a web services system 557 is illustrated between the application server 540 and the data services 560. According to embodiments of the present invention, the web services system 557 serves as a collection point for data requested from each of the disparate data services systems comprising the data services 560. When the application server 540 requires customer profile data from one or more of the data services 560 for preparation or update of a customer profile, the application server 540 passes a data query to the web services system 557. The web services system formulates a data query to each of the available data services systems for obtaining any available data for a given customer as identified by a set-top box identification associated with the customer. The web services system 557 serves as an abstraction layer between the various data services systems and the application server 540. That is, the application server 540 is not required to communicate with the disparate data services systems, nor is the application server 540 required to understand the data structures or data types utilized by the disparate data services systems. The web services system 557 is operative to communicate with each of the disparate data services systems for obtaining necessary customer profile data. The customer profile data obtained by the web services system is assembled and is returned to the application server 540 for ultimate processing via the middleware layer 542, as described above.

According to embodiments of the present invention, a mobile computing device 100 may access the CATV system 500 via an access point base station 575, which allows a mobile computing device to connect to any number of wireless, wireline, PSTN, CATV-based communications systems, and the like. Access to a CATV system 500 may allow for a user to access and utilize one or more applications, features or services available to the user via the CATV system. As should be appreciated, a mobile computing device may also connect to a distributed computing network via a wireless telecommunications network. Following from the example used herein, a Remote DVR Scheduler Application may be resident on the mobile computing device 100 or other computing device as a client application, or the Remote DVR Scheduler Application may be resident at the Headend 535. The mobile computing device 100 may gain access to the desired application in a variety of suitable methods. According to one method, the mobile computing device 100 may access the CATV 500 via the IP network 525 to the Web Services System 557 and Data Services platform 560. According to one embodiment, the authentication system 566 may be utilized in association with the automated user authentication identification methods and systems described herein to allow the user access to desired applications, features and services of the example CATV 500 without cumbersome entry of authentication information discussed above. According to another embodiment, the mobile computing device 500 may be allowed direct access to the desired application via the authentication identification methods and systems described herein without passing through the authentication system 566.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention. Although embodiments of the present invention have been described with reference to particular standards and protocols, the present invention is not limited to such standards and protocols.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing automated user authentication identification for customized converged services, the method comprising:
   receiving an indication of powering on of a mobile computing device;
   validating a user of the computing device seeking access to a network through an authentication process;
   receiving an indication of a selection of an authentication-required application;
   obtaining validated user authentication identification data associated with an identification number of the mobile computing device;
   sending validated user authentication identification data to a service provider associated with selected authentication-required application;
   allowing access to functionalities associated with services associated with the validated user authentication identification data upon validated user authentication identification data being validated with the service provider;
   allowing a communication between billing systems of the service provider and a second service provider;
   obtaining service codes associated with services subscribed to by the user; and
   allowing access to functionalities associated with services subscribed to by the user.

2. The method of claim 1, wherein validating a user of the mobile computing device seeking access to a network through an authentication process includes retrieving from the computing device stored authentication data for passing to the service provider associated with selected authentication-required application.

3. The method of claim 2, wherein retrieving from the mobile computing device stored authentication data includes retrieving an identification number associated with the mobile computing device that may be compared with valid authentication identification data associated with users who are allowed access to functionalities associated with services associated with the validated user authentication identification data.

4. The method of claim 1, wherein the identification number is a telephone number.

5. The method of claim 1, wherein the network is a wireless network.

6. The method of claim 1, wherein a mobile identification number is utilized for validating a user of the mobile computing device.

7. The method of claim 1, wherein the service provider is a mobile phone service provider and the second service provider is a cable television service provider.

8. A system for providing automated user authentication identification for customized converged services, the system comprising:
   a server comprising a processor and a memory operative:
   to receive an indication of a request from a mobile computing device seeking to access an authentication-required application;
   to receive validated user authentication identification data associated with an identification number of the mobile computing device;
   to check validated user authentication identification data with stored data associated with the mobile computing device;
   to allow access to functionalities associated with services associated with the validated user authentication identification data upon validated user authentication identification data being validated with the stored data associated with the mobile computing device;
   to allow a communication between billing systems of the service provider and a second service provider;
   to obtain service codes associated with services subscribed to by the user; and
   to allow access to functionalities associated with services subscribed to by the user.

9. The system of claim 8, wherein the identification number is a telephone number.

10. The system of claim 8, wherein a mobile identification number is utilized for validating a user of the mobile computing device.

11. The system of claim 8, wherein the first service provider is a mobile phone service provider and the second service provider is a cable television service provider.

12. A non-transitory computer readable memory containing computer executable instructions which when executed by a computer perform a method for providing automated user authentication identification for customized converged services, comprising:
- powering on a mobile computing device;
- validating a user of the mobile computing device seeking access to a network through an authentication process;
- receiving an indication of a selection of an authentication-required application;
- obtaining validated user authentication identification data associated with an identification number of the mobile computing device;
- sending validated user authentication identification data to a service provider associated with selected authentication-required application;
- allowing access to functionalities associated with services associated with the validated user authentication identification data upon sent validated user authentication identification data being validated with the service provider;
- allowing a communication between billing systems of the service provider and a second service provider;
- obtaining service codes associated with services subscribed to by the user; and
- allowing access to functionalities associated with services subscribed to by the user.

13. The computer readable memory of claim 12, wherein the identification number is a telephone number.

14. The computer readable memory of claim 12, wherein the network is a wireless network.

15. The computer readable memory of claim 12, wherein a mobile identification number is utilized for validating a user of the mobile computing device.

16. The computer readable memory of claim 12, wherein the first service provider is a mobile phone service provider and the second service provider is a cable television service provider.

17. The computer readable memory of claim 12, wherein validating a user of the mobile computing device seeking access to a network through an authentication process includes retrieving from the mobile computing device a stored identification number associated with the mobile computing device for passing to the service provider associated with selected authentication-required application that may be compared with valid authentication identification data associated with users who are allowed access to functionalities associated with services associated with the validated user authentication identification data.

* * * * *